Patented July 13, 1954

2,683,667

UNITED STATES PATENT OFFICE 2,683,667

HEAT INSULATING COATING

Joseph L. Utter, Stoughton, Mass., assignor to the United States of America as represented by the Secretary of the Army No Drawing. Application April 28, 1952,
Serial No. 284,829

6 Claims. (Cl. 106—58)

The present invention comprises an improved heat insulating coating for use on the walls and other parts of a rocket combustion chamber that are exposed to the products of combustion, and it therefore is a general object of this invention to provide an improved combustion chamber structure.

It is a further and more specific object of my invention to provide a heat insulation coating for component parts of a structure that are exposed to hot gases.

It is a still further object to provide an air drying magnesium oxide-methyl phosphate cement composition for coating metal rocket motors.

Other objects and advantages will be made apparent from the following description the novel features thereof being pointed out in the appended claims.

The heat insulating coating made in accordance with my invention is a cold setting inorganic coating suitable for aluminum, magnesium or steel walls, and while rather soft in its final in-place form has proven itself to be highly resistant to thermal and mechanical shock and to erosion.

The coating comprises a mixture of finely divided refractory material in a solution containing ethyl silicate and an alcohol to which is added phosphoric anhydride, as will presently be explained.

The preferred composition of the material is:

Solids:
    85% silicon dioxide
    15% magnesium oxide
Binder solution:
    80% methyl alcohol
    20% ethyl silicate
    10% by weight of phosphoric anhydride The ratio of binder solution to solids should be approximately 30 to 120 cc. of solution to 100 grams of the solids.

When a thin coating is to be applied the solids are so selected that all of the $SiO_2$ passes a 80 mesh screen and all of the MgO passes a 100 mesh screen respectively.

The preferred screen analysis of the $SiO_2$ for general use was found to be as follows:

| Mesh: | Per cent |
|---|---|
| On 60 | 5 |
| Thru 60 on 80 | 11 |
| Thru 80 on 100 | 12 |
| Thru 100 on 140 | 16 |
| Thru 140 on 200 | 12 |
| Thru 200 | 44 |

A gradation of particle sizes produces a packing effect, and a denser coating and it was found that a high proportion of finely divided $SiO_2$ has a detrimental effect on the adherence of the coating to the metal body.

A satisfactory and workable composition comprises a mixture of about not less than 10% by weight of comminuted magnesium oxide, the remaining solid being silicon dioxide, in a solution containing methyl alcohol and phosphoric anhydride in a weight ratio of not less than six to one and ethyl silicate in an amount not exceeding the methyl alcohol-phosphoric anhydride solution in weight, the ratio of the solid to the liquid portions of the composition being adjusted to give the required fluidity, the ratio of phosphoric anhydride to magnesium oxide of the composition being at most one to one.

There exists a number of materials such as zircon, zirconia, alumina, sillimanite, beryllium, and crushed firebrick which may be used in place of the silicon dioxide but I have found that because of its thermal expansion characteristics the silicon yielded the best results in thermal spalling tests.

The proportions of the liquid binder may be varied from the optimum recited above. The ethpl silicate may range up to 50% with acceptable results. It is added as the unhydrolyzed material but being in a slightly acid medium and in the presence of some moisture it hydrolyzes and deposits a silica gel within and on the surface of the coating as it dries. This reaction is separate from the reaction of the complex methyl phosphates which are formed when phosphoric anhydride is dissolved in methyl alcohol with the magnesium oxide present in the filler material. In this case a magnesium phosphate of undeterminate chemical composition is formed which acts as the primary binder for the coating but which in itself is not very resistant to moisture attack.

It has been found by experimentation that other additions to the liquid binder may be made if they are compatible with methyl alcohol. Zein, an alcohol soluble protein for example, has been added with excellent results insofar as cold strength adherence and moisture resistance. For high tmperature use—about 500° F.—the zein burns and in the process leaves the coating somewhat soft and chalky.

The $P_2O_5$ can be varied from the optimum of 10% recited above to about 25% with acceptable results. If however there be insufficient magnesium oxide present any unreacted methyl phosphate results in an undesirable soluble portion of the coating. When the phosphoric anhydride is increased the magnesium oxide content should be correspondingly increased to insure at all times an excess thereof. It is necessary to cool the solution of methyl alcohol ethyl silicate to 32° F. or below and then slowly add the phosphoric anhydride in order to obtain a satisfactory solution.

The ability of the coating material to resist thermal shock is an outstanding characteristic. Tests were conducted in accordance with the following:

10 cycles—room temperature to —90° F. to 160° F. (coated tube)

5 cycles—room temperature to oxyacetylene flame—air cool with blast repeat (coated flat plates and tubes)

5 cycles —75° F. to oxyacetylene flame.

In none of the foregoing did the coating spall away from the metal.

In actual firing tests where the coating was used for protection in a rocket motor chamber and a nozzle plate, no spalling occurred. It is believed that the spalling resistance is chiefly due to the soft elastic nature of the coating which however does not prove detrimental to the erosion resistance of the material.

Because of its acid nature the coating material etches the surface of most metals when applied thus insuring good mechanical adherence. When a break does occur in adherence tests the break is within the material itself and a layer of coating is left firmly adhering to the metal.

Having thus described my invention and the advantages thereof I do not wish to be limited to the details herein disclosed otherwise than as set forth in the claims, but what I claim is:

1. A composition for use as a heat insulating coating for a rocket combustion chamber which comprises a mixture of about 15% comminuted magnesium oxide and 85% comminuted silicon dioxide in a solution comprising not more than 50 percent of ethyl silicate and the remainder methyl alcohol together with 10 to 25 percent by weight of phosphoric anhydride.

2. The invention according to claim 1 wherein the magnesium oxide is so comminuted that it will pass through a 100 mesh screen.

3. The invention according to claim 2 in which the silicon dioxide is so comminuted that it will pass through an 80 mesh screen.

4. An air drying composition for use as a heat insulating coating for a rocket combustion chamber or the like which comprises a mixture of about 15% comminuted magnesium oxide and about 85% comminuted silicon dioxide in a solution consisting of 80% methyl alcohol and 20% ethyl silicate together with 10% by weight of phosphoric anhydride.

5. The invention according to claim 4 wherein the ratio of the said solution to the solid portion of the composition is approximately 30 to 120 cc. of solution to 100 grams of solids.

6. An air drying composition for use as a heat insulating coating which comprises a mixture of solids consisting of not less than 10% by weight of comminuted magnesium oxide, the remaining solid being comminuted silicon dioxide, in a solution containing methyl alcohol and phosphoric anhydride in a weight ratio of not less than six to one and ethyl silicate not exceeding the methyl alcohol-phosphoric anhydride solution in weight, the ratio of phosphoric anhydride to magnesium oxide of the composition being at most one to one.

References Cited in the file of this patent

UNITED STATES PATENTS

| Number | Name | Date |
|---|---|---|
| 2,152,152 | Prosen | Mar. 28, 1939 |
| 2,256,795 | Seil | Sept. 23, 1941 |
| 2,299,552 | McGregor et al. | Oct. 20, 1942 |